(12) United States Patent
Chen (10) Patent No.: US 11,158,900 B2
(45) Date of Patent: Oct. 26, 2021

(54) CASING FOR ACCOMMODATING BATTERY MODULE AND BATTERY PACK

(71) Applicant: Contemporary Amperex Technology Co., Limited, Ningde (CN)

(72) Inventor: Zhiming Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 167 days.

(21) Appl. No.: 16/541,547

(22) Filed: Aug. 15, 2019

(65) Prior Publication Data

US 2020/0161610 A1 May 21, 2020

(30) Foreign Application Priority Data

Nov. 16, 2018 (CN) .......................... 201821893737.0

(51) Int. Cl.
  *H01M 50/20* (2021.01)
  *H01M 50/112* (2021.01)
  *H01M 50/54* (2021.01)

(52) U.S. Cl.
  CPC ......... *H01M 50/20* (2021.01); *H01M 50/112* (2021.01); *H01M 50/54* (2021.01)

(58) Field of Classification Search
  CPC ..... H01M 50/20; H01M 50/54; H01M 50/112
  See application file for complete search history.

(56) References Cited

U.S. PATENT DOCUMENTS

| 2010/0068616 A1 | 3/2010 | Uh |
| 2012/0009463 A1 | 1/2012 | Lee |
| 2013/0143075 A1* | 6/2013 | Yi .................. H01M 50/502 429/7 |
| 2013/0337310 A1 | 12/2013 | Omura et al. |
| 2017/0214103 A1* | 7/2017 | Onnerud ............ H01M 50/116 |

FOREIGN PATENT DOCUMENTS

| CN | 105118939 A | 12/2015 |
| CN | 107507938 A | 12/2017 |
| CN | 207967118 U | 10/2018 |
| CN | 208014778 U | 10/2018 |
| CN | 209071424 U | 7/2019 |
| JP | 2017073337 A | 4/2017 |
| KR | 20140021128 A | 2/2014 |

OTHER PUBLICATIONS

PCT International Search Report for PCT/CN2019/117361, dated Feb. 3, 2020, 10 pages.
The extended European search report dated Apr. 6, 2020 for European Application No. 19192932.2, 8 pages.

* cited by examiner

*Primary Examiner* — Kenneth J Douyette
(74) *Attorney, Agent, or Firm* — Law Offices of Liaoteng Wang (57) ABSTRACT

The disclosure relates to a casing for accommodating battery module and a battery pack. The casing comprises: a housing comprising a bottom plate and a side plate connected to the bottom plate, wherein the bottom plate and the side plate enclose an accommodating space, and the bottom plate is provided with a plurality of recesses opening to the accommodating space; and a buffer assembly comprising at least a first buffer member, which is disposed corresponding to the recess. In the casing for accommodating battery module according to the disclosure, when the battery module is received in the casing, the buffer assembly is located between the battery module and the bottom plate.

15 Claims, 6 Drawing Sheets

CASING FOR ACCOMMODATING BATTERY MODULE AND BATTERY PACK

CROSS-REFERENCE TO RELATED APPLICATION

This application is based on and claims priority to Chinese Patent Application No. 201821893737.0 filed on Nov. 16, 2018, which is incorporated herein by reference in its entirety.

FIELD

The disclosure relates to the technical field of energy storage device, and in particular to a casing for accommodating battery module and a battery pack.

BACKGROUND

Secondary batteries are increasingly used in vehicles, manufacture equipment, communication equipment and the like. In order to obtain high voltage and high current, secondary batteries are usually used in groups. That is to say, a battery module is formed from cells, and a plurality of battery modules are further combined and packaged through a casing. However, when a bottom plate of the casing is subjected to an impact force from an impact or the like, the fixing stability of the battery module in the casing is reduced, and even the safety distance between the battery module and the bottom plate of the casing is broken, which causes potential safety problems.

SUMMARY

According to embodiments of the disclosure, there is provided a casing for accommodating battery module and a battery pack in order to improve safety of the battery pack.

In one aspect, embodiments of the disclosure provide a casing for accommodating battery module, comprising: a housing comprising a bottom plate and a side plate connected to the bottom plate, wherein the bottom plate and the side plate enclose an accommodating space, and the bottom plate is provided with a plurality of recesses opening to the accommodating space; and a buffer assembly comprising at least a first buffer member, which is disposed corresponding to the recess According to an aspect of embodiments of the disclosure, the bottom plate comprises an inner surface and an outer surface opposite to each other, wherein the recess is located on the inner surface, the first buffer member is filled in the recess, and a top surface of the first buffer member is flush with the inner surface or protrudes from the inner surface.

According to an aspect of embodiments of the disclosure, the recess is a strip-shaped recess, the strip-shaped recesses are spaced apart on the bottom plate and extend in a same direction, and the first buffer member comprises a plurality of elastic strips, which are disposed corresponding to the strip-shaped recesses.

According to an aspect of embodiments of the disclosure, the recess is a block-shaped recess, the block-shaped recesses are spaced apart on the bottom plate, and the first buffer member comprises a plurality of elastic blocks, which are disposed corresponding to the block-shaped recesses.

According to an aspect of embodiments of the disclosure, the recesses are distributed on the bottom plate to form a grid distribution, and the first buffer member are mesh-shaped elastomers, which are arranged in the respective recesses in the grid distribution.

According to an aspect of embodiments of the disclosure, the buffer assembly further comprises a second buffer member disposed at a side of the first buffer member away from the bottom plate.

According to an aspect of embodiments of the disclosure, the second buffer member comprises an elastic sheet, in which a plurality of through holes are formed; and there are one or more elastic sheets, and when there are two or more elastic sheets, they are spaced apart from each other.

According to an aspect of embodiments of the disclosure, the second buffer member further comprises a plurality of limiting strips, the limiting strips are spaced apart along an outer periphery of the elastic sheet for limiting a distance between the battery module and the bottom plate.

In another aspect, embodiments of the disclosure provide a battery pack, characterized in that, comprising: one or more battery modules; and a casing according to an aspect of the disclosure for accommodating the one or more battery modules, wherein the buffer assembly is located between the battery module and the bottom plate.

According to another aspect of embodiments of the disclosure, the battery pack further comprises an adhesive for fixing the one or more battery modules to the bottom plate.

In the casing for accommodating battery module according to the embodiment of the disclosure, the buffer assembly is arranged on the bottom plate. When the battery module is received in the casing, the buffer assembly is located between the battery module and the bottom plate. When the bottom plate is subjected to an external impact force or the like, the buffer assembly can absorb the impact force on the bottom plate. Therefore, the fixing stability of the battery module and the safety distance between the battery module and the bottom plate can be ensured, and the safety performance of the battery pack can be improved.

Furthermore, when the battery module is fixed to the bottom plate through an adhesive, the adhesive can also provide insulation between the battery module and the bottom plate of the casing. The buffer assembly can protect the adhesive from being broken or damaged due to an impact force. Therefore, the fixing stability of the battery module can be ensured, and the insulation between the battery module and the bottom plate of the casing can be ensured, so that the battery pack has improved safety performance.

BRIEF DESCRIPTION OF THE DRAWINGS

In order to more clearly illustrate the technical solutions of the embodiments of the disclosure, the drawings used in the embodiments of the disclosure will be briefly described below. It is obvious that the drawings described below are only some implementations of the disclosure. For example, for those skilled in the art, other drawings can be obtained according to the drawings without any creative work.

REFERENCE SIGNS IN THE DRAWINGS 100 battery pack;
200 casing;
210 housing;
211 bottom plate;
211a inner surface;
211b outer surface;
212 side plate;
213 accommodating space;
214 recess;
220 buffer assembly;
221 first buffer member;
222 second buffer member;
223 elastic sheet;
224 limiting strip;
225 through hole;
230 connecting member;
240 fixing member;
250 reinforcing member;
300 battery module;
X length direction;
Y width direction.

DETAILED DESCRIPTION

Below, embodiments of the disclosure will be further described in detail with reference to the drawings and embodiments. The detailed description according to the embodiments and the accompanying drawings are intended to exemplary illustrate the principles of the disclosure and are not intended to limit the scope of the disclosure. That is, the disclosure is not limited to the described embodiments.

For the sake of brevity, only certain numerical ranges are explicitly disclosed herein. However, any lower limit may be combined with any upper limit to form a range that is not explicitly described; and any lower limit may be combined with any other lower limit to form an unspecified range, and any upper limit may be combined with any other upper limit to form an unspecified range. Further, although not explicitly stated, each point or single value between the endpoints of the range is included in the range. Thus, each point or single value can be combined with any other point or single value or combined with other lower or upper limits to form a range that is not explicitly recited.

In the description of the disclosure, it should be noted that, unless otherwise stated, the meaning of "several" is one or more; the meaning of "a plurality" is two or more; "no less than" and "no more than" shall be construed as including the number itself; the orientation or positional relationship indicated by the terms "upper", "lower", "inner", "outer" and the like is merely for the purpose of describing the disclosure and simplifying the description, and is not intended to indicate or imply that the device or component referred to has a particular orientation, is constructed and operated in a particular orientation, and therefore cannot be understood to be a limitation of the disclosure.

In the description of the disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the disclosure can be understood by the person skilled in the art according to actual circumstance.

The above description of the disclosure is not intended to describe each disclosed embodiment or every implementation of the disclosure. The following description more particularly exemplifies the exemplary embodiments. In many places throughout the disclosure, guidance is provided through a series of embodiments that can be used in various combinations. In each instance, the example is merely representative and should not be construed as exhaustive.

For better understanding of the disclosure, a housing for accommodating a battery module and a battery pack according to embodiments of the disclosure will be described below in detail with reference to FIGS. 1 to 11.

Figure 1:
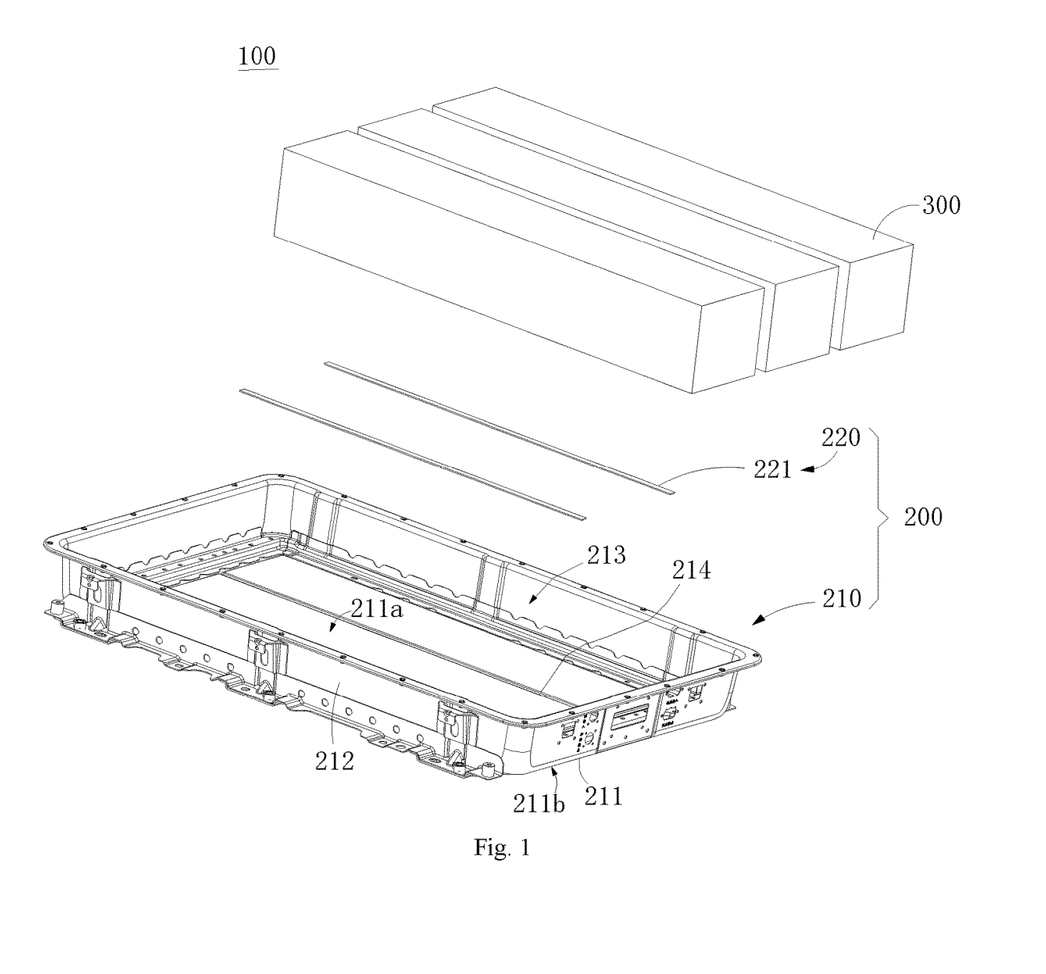
FIG. 1 is an exploded structural view of a battery pack according to an embodiment of the disclosure.

FIG. 1 schematically shows an exploded structure of a battery pack according to an embodiment of the disclosure. Referring to FIG. 1, a battery pack 100 according to an embodiment of the disclosure includes a battery module 300 and a casing 200 for accommodating the battery module 300.

The casing 200 includes a housing 210 and a buffer assembly 220. The housing 210 includes a bottom plate 211 and a side plate 212 connected to the bottom plate 211. The bottom plate 211 and the side plate 212 enclose an accommodating space 213. The bottom plate 211 is provided with a plurality of recesses 214 opening to the accommodating space 213. The buffer assembly 220 includes at least a first buffer member 221, which is disposed corresponding to the recess 114.

The recesses 214 can improve overall strength of the bottom plate 211.

The housing 210 can be made of a metal material having a high strength to protect the battery module 300. The metal material also produces shielding effect, and can ensure that the power transmission of the battery pack 100 is not affected by external environment and ensure safety at the external environment. Also, the housing 210 can be made of a plastic material having a high mechanical property and a low weight, which helps an increase in the energy density of the battery pack 100. When the casing 200 made of plastic material is required to have a good shielding effect, a shielding layer may be provided in the housing 210.

The first buffer member 221 is made of an elastic material such as a thermosetting foam, a thermoplastic foam, or other elastomeric polymer.

The battery module 300 is housed in the accommodating space 213 of the casing 200 and fixed by a fixing member. There are one or more battery modules 300. When there are more than one battery modules 300, the battery modules 300 may be connected in series, in parallel, or in a series-parallel. The battery module 300 includes a plurality of cells, which may be connected in series, in parallel, or in series-parallel. In the embodiment, the cell is for example a prismatic cell, or may have a shape of cylinder or the like, which is not limited herein.

In the casing 200 according to the embodiment of the disclosure, the buffer assembly 220 is arranged on the bottom plate 211. When the battery module 300 is received in the casing 200, the buffer assembly 220 is located between the battery module 300 and the bottom plate 211.

When the bottom plate 211 is subjected to an external impact force or the like, the buffer assembly 220 can absorb the impact force on the bottom plate 211. Therefore, the fixing stability of the battery module 300 and the safety distance between the battery module 300 and the bottom plate 211 can be ensured, and the safety performance of the battery pack 100 can be improved.

There are a plurality of fixing members for fixing the battery module 300. Preferably, the battery module 300 is adhesively fixed to the bottom plate 211 of the casing 200 through an adhesive (not shown). Thus, the casing 200 can use less metal parts, and the energy density of the battery pack 100 can be improved.

The bottom plate 211 includes an inner surface 211a and an outer surface 211b opposite to each other, wherein the inner surface 211a is disposed to face the accommodating space 213, and the outer surface 211b is disposed to face away from the accommodating space 213. An adhesive is applied to the inner surface 211a of the bottom plate 211 to bond and fix the battery module 300 to the bottom plate 211. The adhesive may be a structural adhesive such as an epoxy structural adhesive, a polyurethane structural adhesive, an acrylic structural adhesive, a silicone structural adhesive, a modified silica gel or the like.

Since the adhesive is an insulating material, insulation between the battery module 300 and the casing 200 can be achieved, so that an insulating plate can be omitted and the structure of the casing 200 can be simplified.

Furthermore, since the buffer assembly 220 is arranged on the bottom plate 211 of the casing 200, when the bottom plate 211 is subjected to a force from an impact or the like, the buffer assembly 220 absorbs the impact force on the bottom plate 211. It can protect the adhesive from being broken due to brittleness, improve the stability of bonding and fixing of the battery module 300, and ensure the insulation between the battery module 300 and the casing 200, thereby ensuring high safety performance of the battery pack 100.

Figure 2:
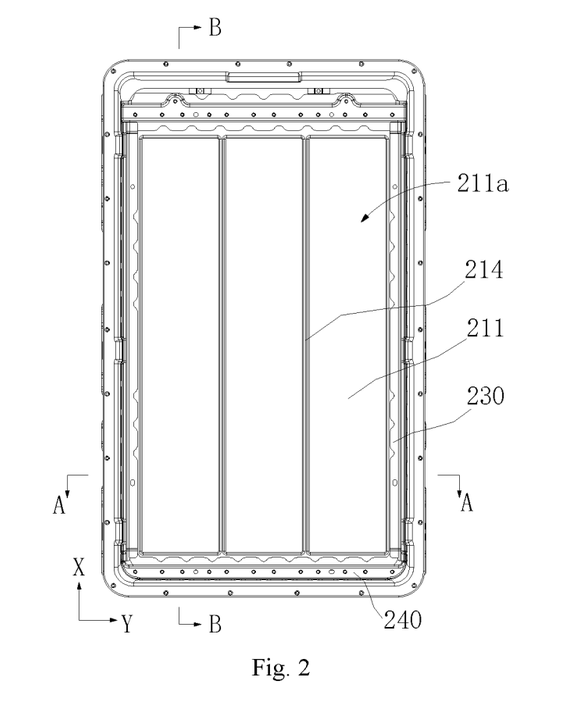
FIG. 2 is a structural schematic diagram of a housing according to an embodiment of the disclosure.
Figure 3:
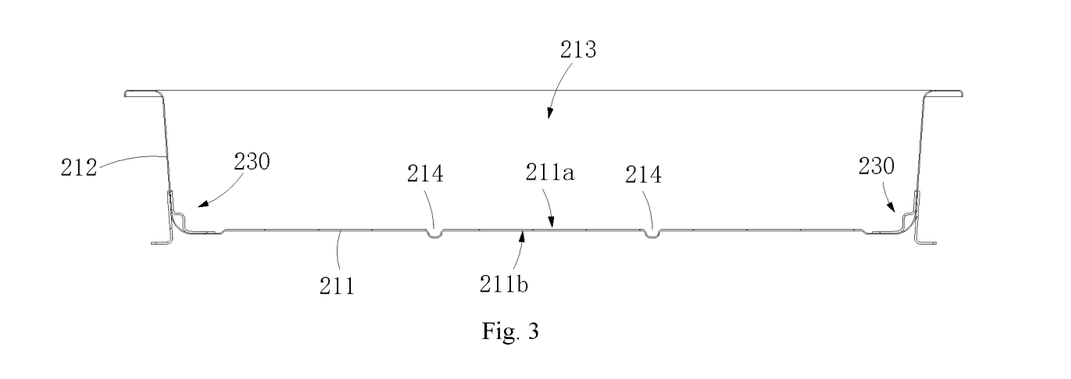
FIG. 3 is a sectional view along A-A in FIG. 2.

In some embodiments, referring to FIG. 2 and FIG. 3, the recess 214 is located on the inner surface 211a, and the first buffer member 221 is filled in the recess 214.

When the battery module 300 is fixed to the bottom plate 211 through an adhesive, the recess 214 can accommodate excess adhesive extruded by the battery module 300. It prevents the adhesive from overflowing and contaminating wires or other electrical components, or bonding the wires or other electrical components together.

Furthermore, since an inner bottom surface of the recess 214 is lower than the inner surface 211a of the bottom plate 211, when the bottom plate 211 of the casing 200 is subjected to a force from impact or the like, the adhesive in the recess 214 is also subjected to impact first. Since the first buffer member 221 in the recess 214 absorbs the impact force, the adhesive in the recess 214 can be prevented from experiencing a brittle fracture, and the bonding integrity can be ensured.

A top surface of the first buffer member 221 can also be lower than the inner surface 211a of the bottom plate 211. Alternatively, the top surface of the first buffer member 221 can also be flush with the inner surface 211a, and a better protect for the adhesive can be provided. The top surface of the first buffer member 221 may also be higher than the inner surface 211a and protrude from the inner surface 211a such that the adhesive can be better protected and a limit for the battery module 300 can be advantageously formed to better ensure the insulation between the battery module 300 and the bottom plate 211.

In some embodiments, the recess 214 is a strip-shaped recess, and the strip-shaped recesses are spaced apart on the bottom plate 211 and extend in the same direction. The first buffer member 221 includes a plurality of elastic strips, which match with the strip-shaped recesses. The elastic strips are respectively arranged in the recesses 214.

The same direction may be a length direction X of the bottom plate 211, a width direction Y of the bottom plate 211, or other direction intersecting with both the length direction X and the width direction Y.

Figure 4:
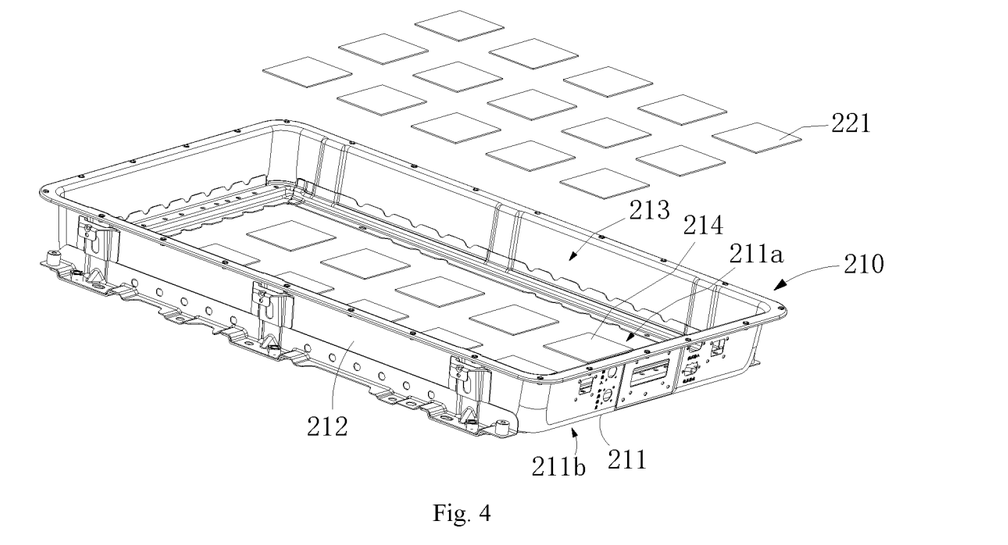
FIG. 4 is an exploded structural view of a casing according to an embodiment of the disclosure.
Figure 5:
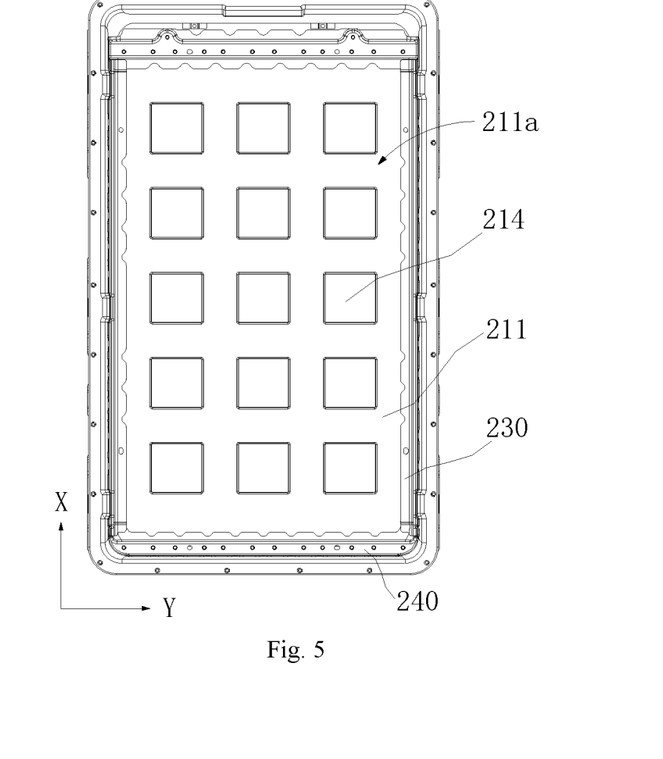
FIG. 5 is a structural schematic diagram of a housing according to an embodiment of the disclosure.

In some embodiments, referring to FIG. 4 and FIG. 5, the recess 214 is a block-shaped recess, and the block-shaped recesses are spaced apart on the bottom plate 211. The first buffer member 221 includes a plurality of elastic blocks, which match with the block-shaped recesses. The elastic blocks are respectively arranged in the recesses 214.

The above block-shaped recess may have a shape of square, diamond, circle, ellipse, an irregular shape or the like. The block-shaped recesses are arranged in an array on the bottom plate 211, or arranged in a radial arrangement, or in an irregular arrangement.

Figure 6:
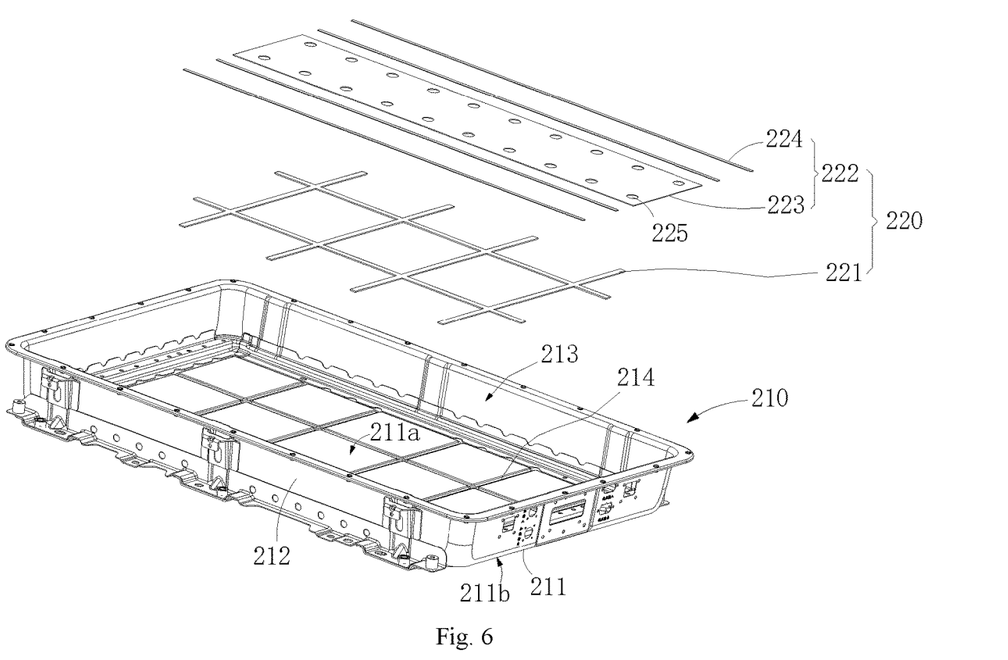
FIG. 6 is an exploded structural view of a casing according to an embodiment of the disclosure.
Figure 7:
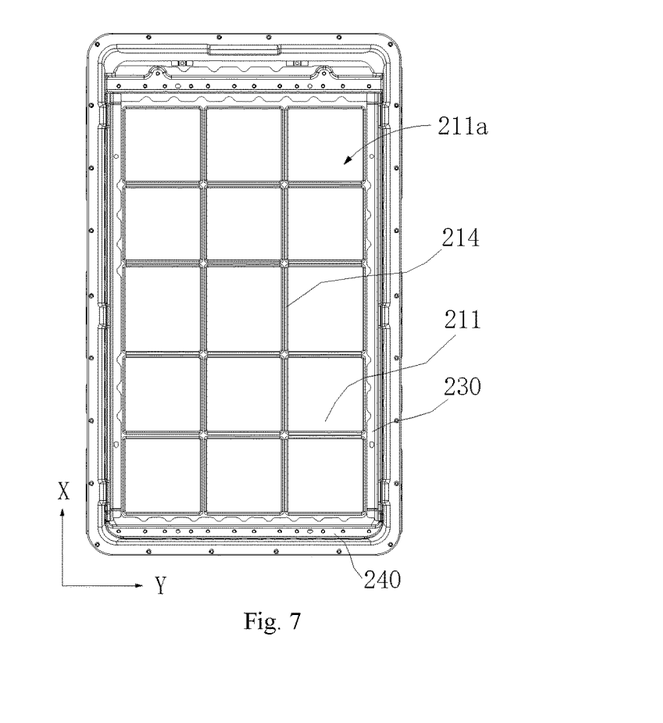
FIG. 7 is a structural schematic diagram of a housing according to an embodiment of the disclosure.

In some embodiments, referring to FIG. 6 and FIG. 7, the recesses 214 are distributed on the bottom plate 211 to form a grid distribution. Recesses 214 extending in the length direction X of the bottom plate 211 intersect with recesses 214 extending in the width direction Y of the bottom plate 211 to form a grid distribution. However, the disclosure is not limited thereto. Alternatively, recesses extending in a first direction intersecting with both the length direction X and the width direction Y intersect with recesses 214 extending in a second direction intersecting with both the length direction X and the width direction Y to form a grid distribution.

The first buffer member 221 is a mesh-shaped elastomer, and the first buffer members 221 are arranged in the respective recesses 214 in a grid distribution.

Furthermore, the buffer assembly 220 may further include a second buffer member 222 disposed at a side of the first buffer member 221 away from the bottom plate 211.

Since the buffer assembly 220 of the casing 200 further includes the second buffer member 222, when a large surface of the bottom plate 211 is subjected to a force such as an external impact force, the second buffer member 222 can absorb the impact force on the large surface of the bottom plate 211. Thereby, the fixing stability of the battery module 300 and the safety distance between the battery module 300 and the bottom plate 211 can be ensured, and the safety performance of the battery pack 100 can be improved.

When the battery module 300 is fixed to the bottom plate 211 through an adhesive, since the second buffer member 222 absorbs the impact force on the large surface of the bottom plate 211, the adhesive can be protected from experiencing a brittle fracture. Therefore, the stability of the bonding and fixing of the battery module 300 can be improved, and the insulation between the battery module 300 and the casing 200 can be ensured, so that the battery pack 100 has high safety performance.

Figure 8:
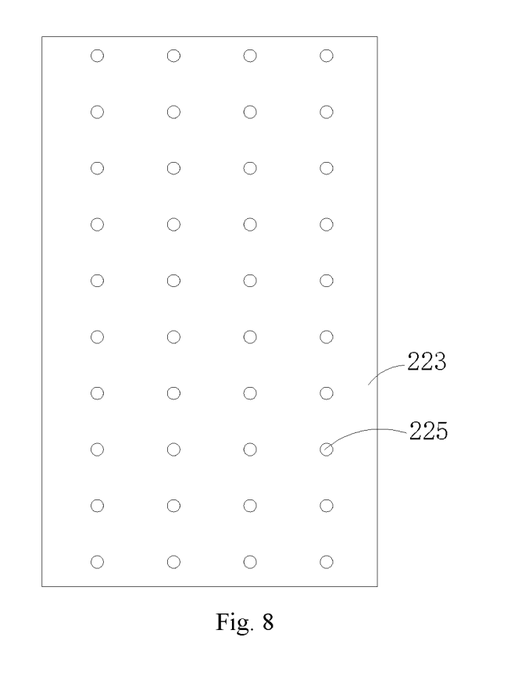
FIG. 8 is a structural schematic diagram of a second buffer member according to an embodiment of the disclosure.

In some embodiments, the second buffer member 222 includes an elastic sheet 223. A plurality of through holes 225 are formed in the elastic sheet 223 such that the adhesive can pass through the holes. It facilitates the bonding and fixing of the battery module 300.

The elastic sheet 223 is made of an elastic material, preferably an elastic insulating material such as a thermosetting foam, a thermoplastic foam, or other elastomeric polymer. The elastic sheet 223 can effectively absorb the impact force on the large surface of the bottom plate 211 and ensure the insulation between the battery module 300 and the casing 200.

The elastic sheet 223 has a thickness of preferably 0.2 mm to 5 mm. Accordingly, it is ensured that the elastic sheet 223 has the above-described effects and the casing 200 has a light weight.

Figure 9:
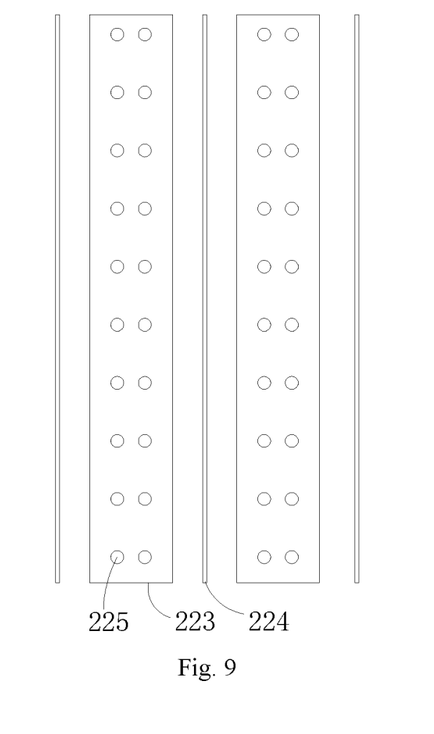
FIG. 9 is a structural schematic diagram of a second buffer member according to an embodiment of the disclosure.

It can be understood that there are one or more elastic sheets 223. When there are two or more elastic sheets 223, they are spaced apart from each other.

As an example, referring to FIG. 6 and FIG. 8, there is one elastic sheet 223 arranged on the inner surface 211a of the bottom plate 211. Preferably, the area of the elastic sheet 223 occupies 40% or more of the area of the bottom plate 211 such that the impact force on the large surface of the bottom plate 211 can be better absorbed and the battery pack 100 has high safety performance.

According to an embodiment, referring to FIG. 9, there are two or more elastic sheets 223, which are arranged on the inner surface 211a of the bottom plate 211 and spaced apart from each other. Preferably, the total area of the two or more elastic sheets 223 occupies 40% or more of the area of the bottom plate 211 such that the impact force on the large surface of the bottom plate 211 can be better absorbed and the battery pack 100 has high safety performance.

To have better effect of the elastic sheet 223 and ensure a safe distance between the battery module 300 and the bottom plate 211, the second buffer member 222 may further include a plurality of limiting strips 224. In these embodiments, the second buffer member 222 includes an elastic sheet 223 and a plurality of limiting strips 224. The limiting strips 224 are arranged on the inner surface 211a of the bottom plate 211 and are spaced apart along an outer periphery of the elastic sheet 223.

The limiting strip 224 can function as a limit for the battery module 300 such that a safety distance between the battery module 300 and the bottom plate 211 can be ensured and the battery pack 100 has high safety performance. Also, the layer thickness of the adhesive can be controlled by the limiting strip 224, which helps to increase the bonding strength.

The limiting strip 224 can be a rigid insulator having a rigidity such that a safe distance between the battery module 300 and the bottom plate 211, as well as the thickness of the adhesive layer, can be more effectively ensured.

The limiting strip 224 has a thickness of preferably 0.2 mm to 5 mm, so that the battery module 300 and the bottom plate 211 have an appropriate safety distance.

It can be understood that the limiting strip 224 can also have a certain elasticity as long as the safety distance between the battery module 300 and the bottom plate 211 can be ensured. The limiting strip 224 with the certain elasticity can have the limiting effect and absorb the impact force on the bottom plate 211.

For example, when there is one elastic sheet 223, one or more limiting strips 224 are respectively disposed at each of two long sides of the elastic sheet 223 such that a safe distance between the battery module 300 and the bottom plate 211 can be ensured.

For example, when there are two or more elastic sheets 223, one or more limiting strips 224 are provided between the two or more elastic sheets 223 and the edges of the bottom plate 211 and between the adjacent two elastic sheets 223 such that a safe distance between the battery module 300 and the bottom plate 211 can be ensured.

In some embodiments, a connecting member 230 may be disposed at a connection portion of the bottom plate 211 and the side plate 212. Accordingly, it can further improve the overall rigidity and strength of the casing 200 and improve the impact resistance of the casing 200, such that it is not easy for the bottom plate 211 to deform due to an external impact force. Thereby, the fixing stability of the battery module 300 and the safety distance between the battery module 300 and the bottom plate 211 can be ensured, and the safety performance of the battery pack 100 can be improved. Optionally, the connecting member 230 is disposed at a connection portion of the long side of the bottom plate 211 and the side plate 212. Optionally, the connecting member 230 includes a first strip-shaped plate and a second strip-shaped plate connected in an L shape. The first strip-shaped plate and the side plate 212 are welded or connected by fasteners, and the second strip-shaped plate and the bottom plate 211 are welded or connected by fasteners.

Figure 10:
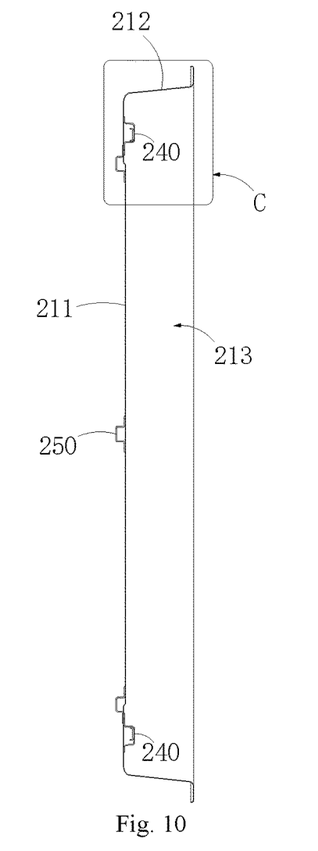
FIG. 10 is a sectional view along B-B in FIG. 2.
Figure 11:
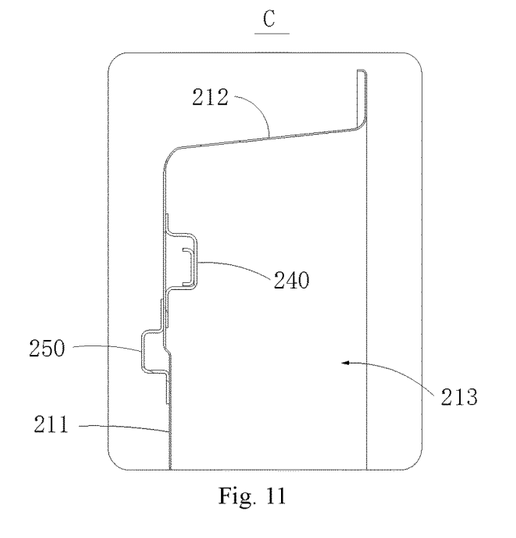
FIG. 11 is an enlarged view of a portion in FIG. 10.

In some embodiments, referring to FIG. 10 and FIG. 11, a fixing member 240 may be disposed on the inner surface 211a of the bottom plate 211 for fixing the battery module 300. Optionally, the bottom plate 211 includes two opposite wide sides, and at each of the two wide sides, a fixing member 240 is arranged. The fixing member 240 extends in the width direction Y of the bottom plate 211, and its top surface is higher than the inner surface 211a of the bottom plate 211. A battery pack composed of one or more battery modules 300 is disposed between the two fixing members 240, and is fixed to the fixing member 240 through the connecting members such that the mounting and fixing of the battery pack is achieved. Optionally, a threaded hole is disposed in the fixing member 240, and the connecting member includes a bolt for matching with the threaded hole. The mounting and fixing of the battery pack is achieved by the matching of the bolt and the threaded hole.

Furthermore, a reinforcing member 250 can be disposed on the outer surface 211b of the bottom plate 211. Accordingly, the overall rigidity and strength of the casing 200 can be further improved, and the impact resistance of the casing 200 can be improved, such that the bottom plate 211 is not easy to deform due to an external impact force. Therefore, it is advantageous to ensure the fixing stability of the battery module 300 and the safety distance between the battery module 300 and the bottom plate 211, thus it helps to improve the safety performance of the battery pack 100. As an example, the reinforcing member 250 includes a plurality of reinforcing beams spaced apart from each other in the length direction X or the width direction Y of the bottom plate 211. Optionally, the reinforcing beam and the bottom plate 211 are welded or connected through fasteners.

Although the disclosure has been described with reference to the preferred embodiments, various modifications may be made to the disclosure and components may be replaced with equivalents without departing from the scope of the disclosure. In particular, the technical features mentioned in the various embodiments can be combined in any manner as long as there is no structural conflict. The disclosure is not limited to the specific embodiments disclosed herein, but comprises all technical solutions falling within the scope of the claims.

What is claimed is:

1. A casing for accommodating battery module, wherein the casing comprises:
   a housing comprising a bottom plate and a side plate connected to the bottom plate, wherein the bottom plate and the side plate enclose an accommodating space, and the bottom plate is provided with a plurality of recesses opening to the accommodating space; and a buffer assembly comprising at least a first buffer member, which is filled in the recess, wherein the bottom plate comprises an inner surface and an outer surface opposite to each other, wherein the recess is located on the inner surface, wherein the buffer assembly further comprises a second buffer member disposed at a side of the first buffer member away from the bottom plate, wherein the second buffer member comprises an elastic sheet, there are one or more elastic sheets, and when there are two or more elastic sheets, they are spaced apart from each other, and wherein the second buffer member further comprises a plurality of limiting strips, the limiting strips are spaced apart along an outer periphery of the elastic sheet for limiting a distance between the battery module and the bottom plate.

2. The casing according to claim 1, wherein a top surface of the first buffer member is flush with the inner surface or protrudes from the inner surface.

3. The casing according to claim 1, wherein the recess is a strip-shaped recess, the strip-shaped recesses are spaced apart on the bottom plate and extend in a same direction, and the first buffer member comprises a plurality of elastic strips, which are disposed corresponding to the strip-shaped recesses.

4. The casing according to claim 1, wherein the recess is a block-shaped recess, the block-shaped recesses are spaced apart on the bottom plate, and the first buffer member comprises a plurality of elastic blocks, which are disposed corresponding to the block-shaped recesses.

5. The casing according to claim 1, wherein the recesses are distributed on the bottom plate to form a grid distribution, and the first buffer member are mesh-shaped elastomers, which are arranged in the respective recesses in the grid distribution.

6. The casing according to claim 1, wherein a plurality of through holes are formed in the elastic sheet.

7. The casing according to claim 2, wherein the recess is a strip-shaped recess, the strip-shaped recesses are spaced apart on the bottom plate and extend in a same direction, and the first buffer member comprises a plurality of elastic strips, which are disposed corresponding to the strip-shaped recesses.

8. The casing according to claim 2, wherein the recess is a block-shaped recess, the block-shaped recesses are spaced apart on the bottom plate, and the first buffer member comprises a plurality of elastic blocks, which are disposed corresponding to the block-shaped recesses.

9. The casing according to claim 2, wherein the recesses are distributed on the bottom plate to form a grid distribution, and the first buffer member are mesh-shaped elastomers, which are arranged in the respective recesses in the grid distribution.

10. A battery pack comprising:

one or more battery modules; and a casing for accommodating the one or more battery modules, wherein the casing comprises:

a housing comprising a bottom plate and a side plate connected to the bottom plate, wherein the bottom plate and the side plate enclose an accommodating space, and the bottom plate is provided with a plurality of recesses opening to the accommodating space; and a buffer assembly comprising at least a first buffer member, which is filled in the recess, wherein the buffer assembly is located between the battery module and the bottom plate, wherein the bottom plate comprises an inner surface and an outer surface opposite to each other, wherein the recess is located on the inner surface, wherein the buffer assembly further comprises a second buffer member disposed at a side of the first buffer member away from the bottom plate, wherein the second buffer member comprises an elastic sheet, there are one or more elastic sheets, and when there are two or more elastic sheets, they are spaced apart from each other, and wherein the second buffer member further comprises a plurality of limiting strips, the limiting strips are spaced apart along an outer periphery of the elastic sheet for limiting a distance between the battery module and the bottom plate.

11. The battery pack according to claim 10, wherein the battery pack further comprises an adhesive for fixing the one or more battery modules to the bottom plate.

12. The battery pack according to claim 10, wherein a top surface of the first buffer member is flush with the inner surface or protrudes from the inner surface.

13. The battery pack according to claim 10, wherein the recess is a strip-shaped recess, the strip-shaped recesses are spaced apart on the bottom plate and extend in a same direction, and the first buffer member comprises a plurality of elastic strips, which are disposed corresponding to the strip-shaped recesses.

14. The battery pack according to claim 10, wherein the recess is a block-shaped recess, the block-shaped recesses are spaced apart on the bottom plate, and the first buffer member comprises a plurality of elastic blocks, which are disposed corresponding to the block-shaped recesses.

15. The battery pack according to claim 10, wherein the recesses are distributed on the bottom plate to form a grid distribution, and the first buffer member are mesh-shaped elastomers, which are arranged in the respective recesses in the grid distribution.

* * * * *